(12) United States Patent
LoGiudice

(10) Patent No.: US 6,899,501 B2
(45) Date of Patent: May 31, 2005

(54) FASTENER FOR FASTENING A LENGTH OF WIRE TO THE GROUND

(75) Inventor: John LoGiudice, Lake Mary, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/374,864

(22) Filed: Feb. 26, 2003

(65) Prior Publication Data

US 2004/0165968 A1 Aug. 26, 2004

(51) Int. Cl.$^7$ ............................................... F16B 15/00
(52) U.S. Cl. ........................ 411/457; 411/920; 52/103; 52/155; 116/173; 40/607.06; 40/607.1
(58) Field of Search .................... 52/103, 155; 248/530, 248/49, 67.7; 40/607.05, 607.06, 607.1; 116/173; 411/920, 475, 485, 457

(56) References Cited

U.S. PATENT DOCUMENTS

| 249,851 | A | * | 11/1881 | McGill | 40/669 |
| 337,057 | A | * | 3/1886 | Gingras | 119/630 |
| 3,204,355 | A | * | 9/1965 | Whitman | 40/660 |
| 5,092,556 | A | * | 3/1992 | Darling et al. | 248/519 |
| 6,195,926 | B1 | * | 3/2001 | Jarl et al. | 40/645 |
| 6,276,644 | B1 | * | 8/2001 | Jennings et al. | 248/49 |
| 6,347,600 | B1 | * | 2/2002 | Duff, II | 116/209 |
| 6,527,246 | B1 | * | 3/2003 | Stinnett | 248/545 |

* cited by examiner

*Primary Examiner*—Flemming Saether
(74) *Attorney, Agent, or Firm*—Cantor Colburn LLP

(57) ABSTRACT

A fastener for temporarily fastening a length of wire to the ground includes a U-shaped member having leg portions, a bridge portion bridging the leg portions, and a mount portion arranged at one end of the bridge portion. One of the leg portions has a length greater than the length of the bridge portion, and the mount portion is adapted to receive a visual indicator for identifying the location of the wire. An interior surface defined by the bridge of the U-shaped member captures the wire when the leg portions are inserted into the ground.

14 Claims, 1 Drawing Sheet

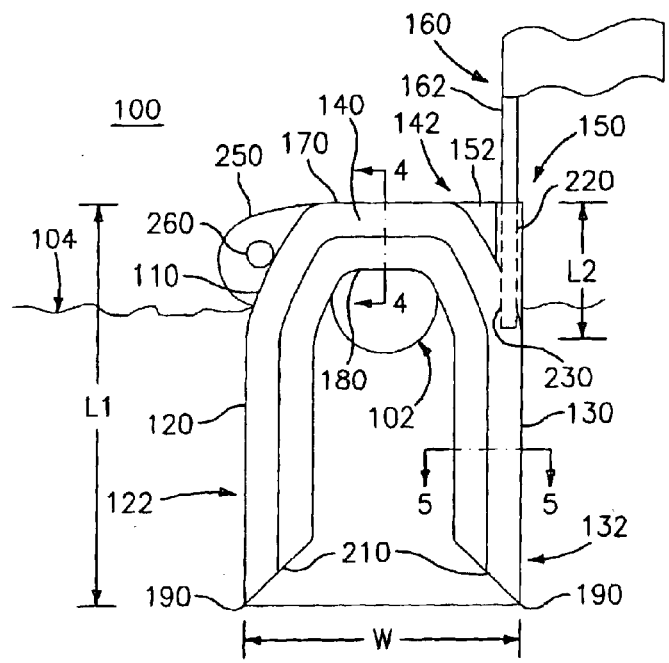
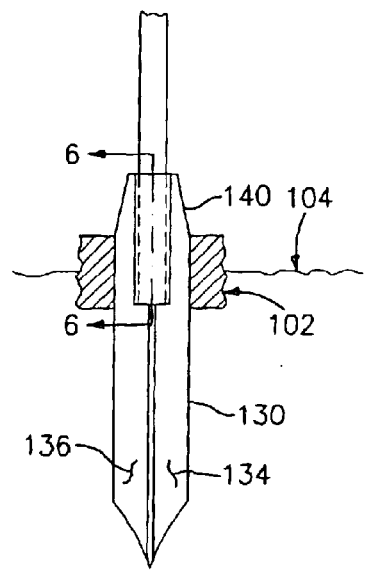
FIG. 1     FIG. 3
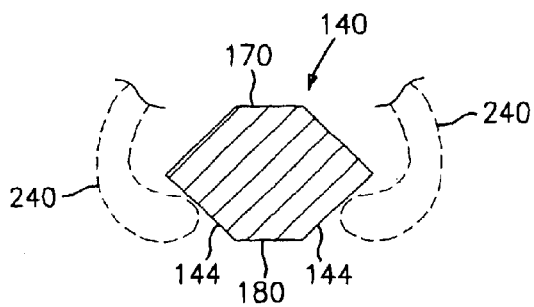
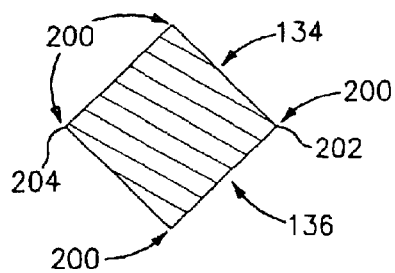
FIG. 4     FIG. 5
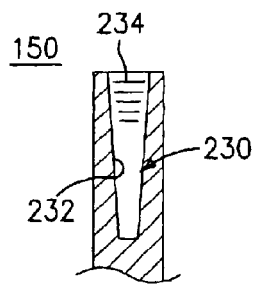
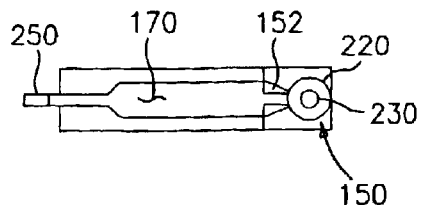
FIG. 6     FIG. 2

FASTENER FOR FASTENING A LENGTH OF WIRE TO THE GROUND

BACKGROUND OF THE INVENTION

The present disclosure relates generally to a fastener for fastening a length of wire to the ground, and particularly to a fastener for temporarily fastening a length of telecommunications wire to the ground.

During the installation of telecommunications wiring at a facility, a service technician may need to first run the wiring from an outside location to an inside location along the ground before a contractor is called upon to bury the wiring. During this interum time, the service technician typically provides the contractor with a visual aid for identifying the location of the surface wiring, which typically involves indicator flags or fluorescent spray paint. Visual aids are typically used in areas where the ground cover includes tall grass or other visually obstructing material. Since the wiring placement is only temporary, it typically is not secured to the ground, which may result in the disassociation of the visual aid from the wiring if the wiring is accidentally kicked or moved. Accordingly, it is desirable to provide an arrangement that deters the disassociation of the visual aid from the temporarily installed wiring.

SUMMARY OF THE INVENTION

In one embodiment, a fastener for temporarily fastening a length of wire to the ground includes a U-shaped member having leg portions, a bridge portion bridging the leg portions, and a mount portion arranged at one end of the bridge portion. The mount portion is adapted to receive a visual indicator for identifying the location of the wire, and one of the leg portions has a length greater than the length of the bridge portion. An interior surface defined by the bridge of the U-shaped member captures the wire when the leg portions are inserted into the ground.

In another embodiment, a fastener for temporarily fastening a length of wire to the ground includes a U-shaped member having leg portions, a bridge portion bridging the leg portions, a mount portion arranged at one end of the bridge portion that is adapted to receive a visual indicator flag, and a visual indicator flag mounted to the mount portion. One of the leg portions has a length greater than the length of the bridge portion. An interior surface defined by the bridge of the U-shaped member captures the wire, and the visual indicator flag identifies the location of the wire, when the leg portions are inserted into the ground.

In a further embodiment, a fastener for temporarily fastening a length of wire to the ground includes means for capturing a portion of the length of wire, means for fastening the fastener to the ground, means for receiving a visual location indicator, and means for visually indicating the location of the wire.

BRIEF DESCRIPTION OF THE DRAWINGS

Referring to the exemplary drawings wherein like elements are numbered alike in the accompanying Figures:

FIG. 1 depicts a front view of an exemplary fastener in accordance with an embodiment of the invention;

FIG. 2 depicts a top view of the exemplary fastener of FIG. 1;

FIG. 3 depicts a side view of the exemplary fastener of FIG. 1;

FIG. 4 depicts a cross-sectional view of a bridge portion of the fastener of FIG. 1;

FIG. 5 depicts a cross-sectional view of a leg portion of the fastener of FIG. 1; and FIG. 6 depicts a cross-sectional view through a mount portion of the fastener of FIG. 1.

DETAILED DESCRIPTION OF THE INVENTION

An embodiment of the invention provides a fastener for temporarily fastening a length of telecommunications wire to the ground. While the embodiment described herein depicts a fastener for telecommunications wire, it will be appreciated that the disclosed invention is also applicable to other types of wire, such as cable television wire or power supply wire for example.

FIG. 1 depicts an exemplary embodiment of a fastener 100 for fastening a length of wire 102 to the ground 104 having a generally U-shaped body 110 with first 120 and second 130 leg portions and a bridge portion 140. Bridge poriton 140 bridges leg portions 120, 130 at the bend of U-shaped body 110. Leg portions 120, 130 may be of equal length "L1", as depicted in FIG. 1, or they may be of different lengths, with first leg portion 120 being length "L1" and second leg portion 130 being length "L2", thereby reducing the amount of insertion and extraction force required to insert/extract fastener 100 into/out of the ground 104. Bridge portion 140 has a width of "W" that is sufficiently sized for the size of wire 102, to be fastened to the ground 104. In an embodiment, L1 is about 6-inches, W is about 2-inches, and the diameter of wire 102 is equal to or less than about 1-inch. An exemplary wire 102 is a telephone communications cable. At one end 142 of bridge portion 140, a mount portion 150 is arranged and adapted for receiving a visual indicator flag 160, flag 160 being used for identifying the location of fastener 100 and wire 102 when fastener 100 is inserted in the ground 104 over wire 102. In an embodiment, fastener 100 includes flat surfaces 170, 180 on the top and bottom of bridge portion 140, respectively, (see also FIG. 4). Flat surface 170 provides and impact surface for an insertion tool, such as a hammer for example. Flat surface 180 provides a surface on the interior of bridge portion 140 for capturing wire 102 without causing damage to the casing of wire 102.

Leg portions 120, 130, or just first leg portion 120 if there is only one long leg, include a point, or knife edge, 190 on the bottom ends 122, 132 (the ends removed from bridge portion 140). In an embodiment, leg portions 120, 130 are similar in shape and have a different shape than bridge portion 140, which facilitates insertion/extraction of fastener 100 into/out of the ground 104 (see FIGS. 4 and 5 for comparison). As shown in FIG. 5, leg portions 120, 130 have a trapezoidal cross-section, thereby defining knife edges 200 for cutting into the ground 104 during insertion. However, leg portions 120, 130 may also have any other cross-sectional shape suitable for the purpose of fastening wire 102 to the ground 104, such as a circle or a polygon for example. Point 190 at ends 122, 132 is defined by angled surface 210 cutting through leg portions 120, 130 at an angle extending from an outside edge 202 to an opposing inside edge 204. In this manner, the intersection of angled surface 210 with the two adjacent outer surfaces 134, 136 of leg portion 130 (and similarly with leg portion 120) defines point 190.

Mount portion 150 includes an outer surface 220 defining a tubular pocket 230 for receiving a flag post 162, which in an embodiment has a diameter of about 0.125-inches. The axis of tubular pocket 230 is arranged parallel to the axis of leg portion 130, thereby enabling flag 160 to be oriented in a vertical position when fastener 100 is inserted in the ground 104. In an embodiment, tubular pocket 230 has an interior surface 232 that is tapered from top to bottom, thereby enabling a tight press fit as flag post 162 is inserted into tubular pocket 230. Interior surface 232 may have internal threads 234 for threadably engaging with external threads (not shown) on the end of flag post 162. A rib 152 ties outer surface 220 of mount portion 150 to bridge portion 140. In an alternative embodiment, flag 160 is integral with fastener 100.

In an embodiment, fastener 100 includes surfaces 144 on bridge portion 140 for receiving a tool (shown generally as dashed lines 240) for extracting fastener 100 from the ground 104. Alternatively, fastener 100 may also include a tab 250 extending from bridge portion 140 having a hole 260 for receiving a hooked tool (not shown) for extracting fastener 100 from the ground 104.

Fastener 100 may be made from any material suitable for fastening wire 102 to the ground 104, such as metal or plastic for example, and may be made of a highly visible color, such as fluorescent orange for example. If fastener 100 is made from plastic, the plastic itself may incorporate the fluorescent orange color. Alternatively, fastener 100 may be coated with a fluorescent color subsequent to fabrication. Fastener 100 may be manufactured from any process suitable for creating the desired structure, such as molding, diecasting or stamping for example.

By using several fasteners 100 equipped with flags 160 to hold down the length of wire 102 to the ground 104, a visual trail of flags 160 will be created for identify the location of the wire 102 for subsequent permanent installation by a contractor. Alternatively, by using several fasteners 100 not equipped with flags 160, but having a fluorescent orange appearance, a length of wire 102 for a temporary installation, such as for telecommunications at a sports event for example, will be securely held in place and easily located for subsequent removal.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A fastener for temporarily fastening a length of wire having a diameter to the ground, comprising:
   a U-shaped member having first and second leg portions and a bridge portion bridging said first and second leg portions;
   wherein at least one of said first and second leg portions has a length greater than said diameter of said wire; and
   a mount portion arranged at said bridge portion, said mount portion comprising an outer surface defining a tubular pocket, said tubular pocket having an axis arranged parallel to the axis of at least one of said first and second leg portions, said mount portion being adapted to receive a visual indicator for identifying the location of said wire; whereby
   an interior surface defined by said bridge of said U-shaped member captures a length of said wire when at least one of said first and second leg portions is inserted into said ground.

2. The fastener of claim 1, wherein:
   at least one of said first and second leg portions includes at least one of a point and a knife edge at the end removed from said bridge portion.

3. The fastener of claim 2, wherein:
   a section of at least one of said first and second leg portions comprises a cross-section comprising a circle, a polygon, or a trapezoid; and
   said end of at least one of said first and second leg portions includes an angled surface defining said at least one of a point and a knife edge.

4. The fastener of claim 3, wherein:
   said section comprises a trapezoidal cross-section; and
   said angled surface extends from one corner of said trapezoid to an opposing corner of said trapezoid, the intersection of said angled surface with two adjacent surfaces of said section defining said point.

5. The fastener of claim 1, wherein said tubular pocket includes at least one of an interior surface that is tapered inward from top to bottom and an interior surface that is threaded; whereby
   a visual indicator flag may be mounted to said mount either by inserting the flag post into the tapered tubular pocket thereby creating a tight fit or by threadably engaging the flag post to the threaded tubular pocket.

6. The fastener of claim 1, wherein:
   said fastener is manufactured from a material comprising plastic, metal, or a combination comprising plastic and metal; and
   an outer surface of said fastener is colored with a highly visible color.

7. The fastener of claim 1, further comprising:
   means for receiving a tool for inserting said fastener into said ground; and
   means for receiving a tool for extracting said fastener from said ground.

8. The fastener of claim 1, wherein said first and second leg portions both have a length greater than said diameter of said wire and both are substantially equal in length.

9. A fastener for temporarily fastening a length of wire having a diameter to the ground, comprising:
   a U-shaped member having first and second leg portions and a bridge portion bridging said first and second leg portions;
   wherein at least one of said first and second leg portions has a length greater than said diameter of said wire;
   a mount portion arranged at said bridge portion, said mount portion comprising an outer surface defining a tubular pocket, said tubular pocket having an axis arranged parallel to the axis of at least one of said first and second leg portions, said tubular pocket including at least one of an interior surface that is tapered inward from top to bottom and an interior surface that is threaded, said mount portion adapted to receive a visual indicator flag; and
   a visual indicator flag mounted to said mount portion; whereby an interior surface defined by said bridge of said U-shaped member captures a length of said wire when at least one of said first and second leg portions is inserted into said ground and said visual indicator flag identifies the location of said wire, and said visual indicator flag maybe detachably mounted to said mount either by inserting the flag post into the tapered tubular pocket thereby creating a tight fit or by threadably engaging the flag post to the threaded tubular pocket.

10. The fastener of claim 9, wherein:

a section of at least one of said first and second leg portions comprises a cross-section comprising a circle, a polygon, or a trapezoid; and at least one of said first and second leg portions includes an angled surface at the end removed from said bridge portion defining at least one of a point and a knife edge.

11. The fastener of claim 9, further comprising:

means for receiving a tool for inserting said fastener into said ground; and means for receiving a tool for extracting said fastener from said ground.

12. The fastener of claim 9, wherein:

said fastener is manufactured from a material comprising plastic, metal, or a combination comprising plastic and metal; and an outer surface of said fastener is colored with a highly visible color.

13. The fastener of claim 9, wherein said visual indicator flag is at least one of detachably mounted and integrally mounted to said mount portion.

14. A fastener for temporarily fastening a length of wire having a diameter to the ground, comprising:

a U-shaped member having first and second leg portions and a bridge portion disposed therebetween, wherein at least one of said first and second leg portions has a length greater than said diameter of said wire; and a mount portion integral with said U-shaped member, said mount portion comprising a flat surface having a vertical dimension and a second surface having a horizontal dimension, said vertical dimension being equal to or greater than said horizontal dimension, said first and second surfaces defining a pocket to receive a visual indicator for identifying the location of said wire;

a visual indicator flag having a flag post mounted to said pocket;

wherein said visual indicator flag is detachably mounted to said pocket either by inserting the flag post into a slip fit pocket, inserting the flag post into a tapered tubular pocket, or threadably engaging the flag post to a threaded tubular pocket;

wherein an interior surface defined by said bridge of said U-shaped member captures a length of said wire when at least one of said first and second leg portions is inserted into said ground.

* * * * *